May 13, 1924.
J. H. WAGENHORST
1,493,658
AUTOMOBILE TIRE, RIM, AND FASTENING MEANS
Filed Jan. 19, 1918
2 Sheets-Sheet 1
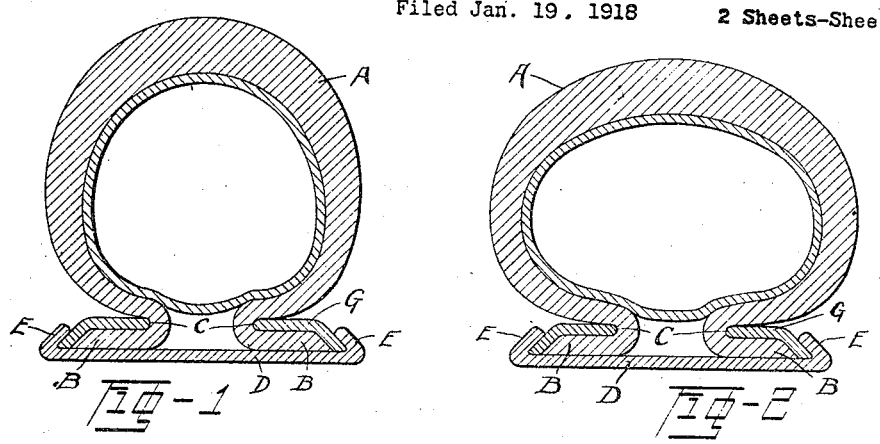
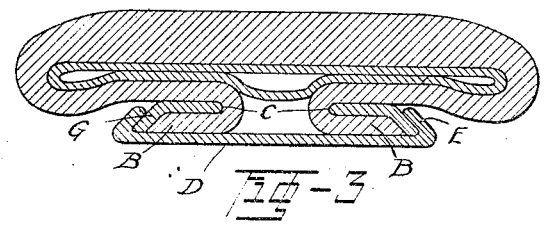
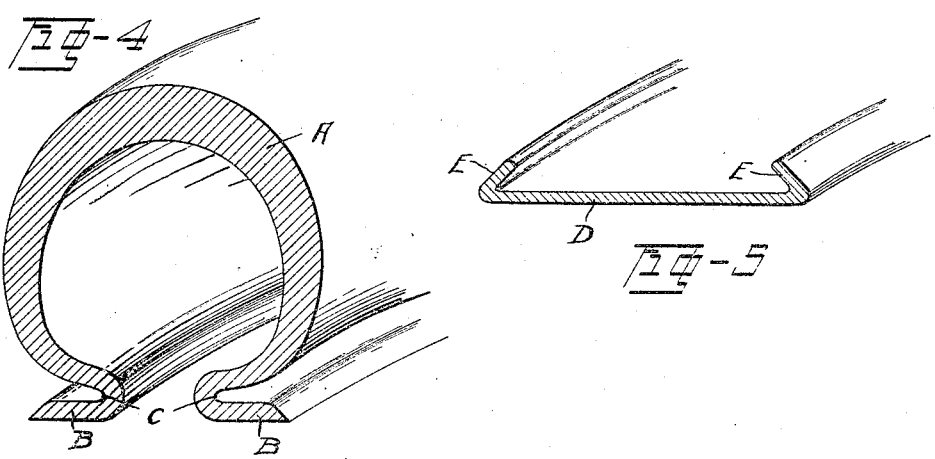
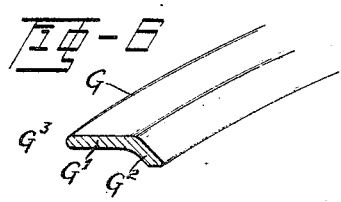
Inventor
J. H. Wagenhorst
By Hull Smith Brock & West
Attys.

May 13, 1924.
J. H. WAGENHORST
1,493,658
AUTOMOBILE TIRE, RIM, AND FASTENING MEANS
Filed Jan. 19, 1918    2 Sheets-Sheet 2
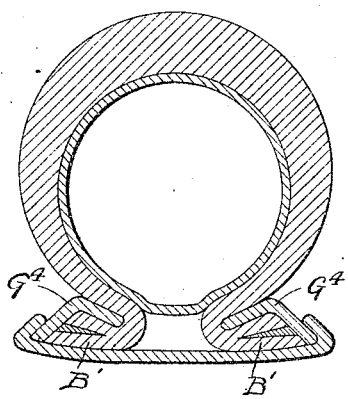
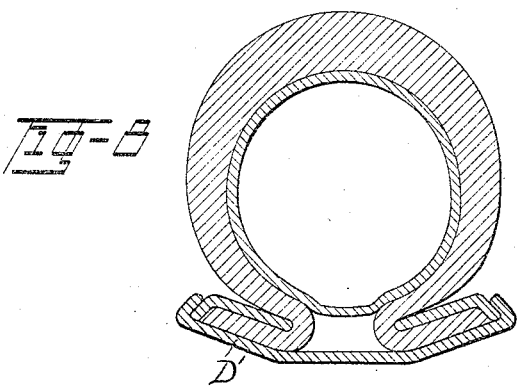
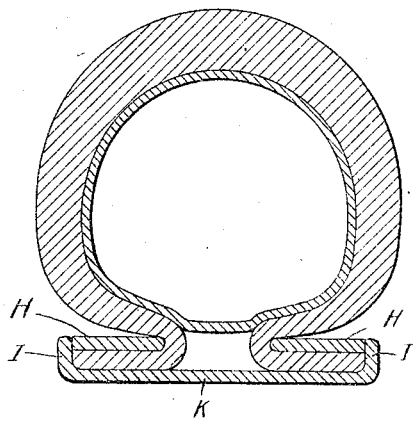
Inventor
J H Wagenhorst
Hull Smith Brock & West
By
Attys.

Patented May 13, 1924.

1,493,658

UNITED STATES PATENT OFFICE.

JAMES H. WAGENHORST, OF AKRON, OHIO.

AUTOMOBILE TIRE, RIM, AND FASTENING MEANS.

Application filed January 19, 1918. Serial No. 212,779.

*To all whom it may concern:*

Be it known that I, JAMES H. WAGENHORST, a citizen of the United States, residing at Akron, in the county of Summit and State of Ohio, have invented a certain new and useful Improvement in Automobile Tires, Rims, and Fastening Means, of which the following is a full, clear, and exact description, reference being had to the accompanying drawings.

This invention relates generally to an automobile tire and rim for the same together with means for detachably connecting the tire to the rim.

Heretofore tires have generally been made with inextensible beads as only the smaller sizes of tires have been made with extensible beads because of the difficulties encountered in properly securing a soft bead tire of large size to the rim.

Tires with inextensible beads are expensive and difficult to manufacture because they involve a more or less complicated bead structure, and must be made upon a sectional or collapsible core which is an expensive appliance so far as maintenance is concerned.

The object of my invention therefore is to provide a tire having an extensible bead, one which can be made upon a solid core, and which can be quickly, easily, and securely attached to a rim of simple construction, the invention being capable of use for large as well as small size tires.

Another object of the invention is to utilize the internal pressure of the tire for the purpose of securely uniting the tire to the rim, or accomplishing the same result by expanding the rim against the bead and rings; and a still further object is to so construct the tire and attach the same, that in yielding to loads and strains, it will do so without subjecting any portion of the tire to a sharp bend or angle; as occurs at the present time at the juncture of the bead of a tire and the outer edge of the rim.

With these, and other objects in view, the invention consists in novel features of construction and arrangement, all of which will be more particularly set forth in the following description and specified in the appended claims.

In the drawings I have shown one form of my invention, and in which Fig. 1 is a transverse sectional view of a tire, rim, and fastening means therefor, the tire being shown as inflated. Fig. 2 is a similar view showing the yielding action of said tire. Fig. 3 is a similar view showing the tire deflated. Fig 4 is a sectional perspective of a portion of a tire. Fig. 5 is a sectional perspective of a portion of the rim. Fig. 6 is a sectional perspective of a portion of the fastening ring or band, and Figs. 7, 8 and 9 show detail sections of modifications.

In constructing an automobile tire in accordance with my invention, I employ the ordinary or usual construction of inner tube, but the outer casing or shoe or tire proper, is constructed substantially different from anything heretofore devised, as the body portion A is made as usual but the bead portions B are turned outwardly in opposite directions as shown, the faces of said edges or bead portions being preferably substantially parallel, but in Fig. 7 I have shown a dovetail or wedge shape bead.

Furthermore, these edges or bead portions are soft and extensible when molded and consequently the tire as a whole can be made upon the solid core and quickly and easily stripped therefrom after the molding operation has been completed, and if desired these laterally projecting edges can be slightly hardened by subsequent treatment, and if preferred can be reinforced by any suitable fabric applied thereto.

If desired the composition of the bead can be such as to harden after removal from the mold.

The body of the tire and the edges thereof are so shaped as to provide annular grooves or recesses C upon the outside, between the adjacent portion of the tire and the laterally extending edges or beads.

The tire thus constructed is adapted for use in connection with any demountable tire carrying rim having a substantially flat base D and this rim is preferably made with slightly converging flanges E, the inner faces F of the tire beads resting upon the flat outer face of the rim.

It will be noted that the rim flanges are quite short or shallow and consequently a rim of minimum weight can be employed in connection with my novel construction of tire.

For the purpose of connecting a tire of this construction to a rim of the character described, I employ metallic rings G which are preferably angular in cross section, that is each ring comprises a flat portion G' and an inclined portion G², bent substantially parallel with the rim flanges as most clearly shown in Figs. 1, 2, and 3.

The flat portion G' is adapted to be inserted into the recesses C formed between the body of the tire and the edge of the bead thereof, and the inner edge G³ is rounded to prevent cutting of the shoe at this point as the curve in the tire is carried around this edge in order to place the laterally projecting edge or bead beneath the portion G' and the extreme portion of the edge or bead bears against the inclined portion G². This inclined portion G² is inserted beneath or inside the rim flange E. It will be understood that the operations just described are carried out at each side of the tire and rim and it will also be understood that the rim can be continuous and the rings transplit or the rim can be transplit and the rings continuous.

When the rings G are inserted in the grooves C they practically constitute, with the edges B, the complete bead of the tire. In other words, for manufacturing purposes the tire has a soft bead so it can be easily stripped from the core, but when it is applied to a rim it has a rigid member associated therewith.

The tire with the rings applied thereto having been arranged upon the rim as indicated, air is supplied to the inner tube for the purpose of inflating the tire and as this tire becomes inflated pressure therewithin causes the rings to forcibly engage the converging flanges of the rim with the result that the tire carrying member or rim, and the tire fastening member or ring move laterally with reference to each other and also move radially with reference to each other and are drawn closely together, clamping or binding the edge of the tire firmly between the carrying and fastening members, converting the soft or extensible bead or edge into a hard or inextensible bead for the time being, and firmly connecting the tire as a whole to the rim.

In Fig. 7 I have shown a slight modification in which the beads B' are made dovetailed or wedge shape, that is the outer edge of said bead is wider than the inner edge, and the ring G⁴ is shaped to conform to this configuration of tire bead.

In Fig. 8 is shown a still further modification in which the rim edges D' are inclined outwardly as shown, and the rings correspondingly shaped, and it will be noted that in both of these modified forms the same clamping action is obtained by the engagement of the rings and rim flanges, and that substantial parallelism is maintained.

In Fig. 9 I have shown flat rings H and the rim flanges I as straight. In this construction the rim K is transplit and the rings H are continuous, and the rim is expanded by any suitable means in order to securely clamp the tire beads between the rim and the ring, accomplishing the fastening operation exactly as heretofore described.

By constructing the tire as herein shown and described it is possible to quickly and easily attach and detach the same to and from a rim of the character shown and a tire of this character connected in this manner can yield to loads and strains without subjecting any part thereof to sharp bending action.

Furthermore, should the tire become punctured or completely deflated, it will, in its deflated condition bear upon broad flat surfaces as shown in Fig. 3 and wherein the least damage will be done therein, whereas heretofore a deflated shoe has been brought into engagement with the edges of the rim with the result of cutting the shoe at that point.

It will thus be seen that I provide a simple and inexpensive improved tire member having an extensible bead and which can be attached to a tire carrying member by means of simple and easily operated fastening devices and in which the pressure within the tire is utilized to bring all these parts into locked relation, or in which the rim can be expanded to accomplish the same result.

Having thus described my invention what I claim is:—

1. The combination with a rim having converging flanges, of a tire having laterally projecting extensible terminal seat portions, and rings angular in cross section, said rings engaging said terminal seat portions and said converging flanges, there being relative movement between said rim and rings whereby the said seat portions are clamped therebetween.

2. The combination with a rim having converging flanges, of a tire casing having beads adapted to rest upon said rim and rings adapted to rest upon said beads and engage said flanges, said parts being such that as the tire is inflated the rim and rings will be made to approach each other and bind the beads therebetween.

3. The combination with a tire having laterally projecting beads, of a rim and rings, portions of said rings being adapted to engage said rim and portions of said rings being adapted to bear upon said beads, the engagement of said rim and rings being such that when the tire is inflated these parts will be brought into locked engagement and bind the beads therebetween.

4. The combination with a tire having laterally projecting beads, a fixed member upon which said casing is adapted to be secured and movable members having engagement with the fixed member and with the casing bead, said engagement being such that when the tire is inflated the fixed and movable members will be caused to move toward each other to bind the casing bead therebetween.

5. The combination with a rim having outwardly extending flanges, of a tire having laterally projecting extensible terminal seat portions, and rings engaging said terminal seat portions and said outwardly projecting flanges, there being relative movement between said rim and rings whereby said seat portions are clamped therebetween.

In testimony whereof, I hereunto affix my signature.

JAMES H. WAGENHORST.